United States Patent
Topham

(10) Patent No.: US 8,218,635 B2
(45) Date of Patent: Jul. 10, 2012

(54) SYSTOLIC-ARRAY BASED SYSTEMS AND METHODS FOR PERFORMING BLOCK MATCHING IN MOTION COMPENSATION

(75) Inventor: Nigel Topham, Midlothian (GB)

(73) Assignee: Synopsys, Inc., Mountain View, CA (US)

( * ) Notice: Subject to any disclaimer, the term of this patent is extended or adjusted under 35 U.S.C. 154(b) by 1653 days.

(21) Appl. No.: 11/528,432

(22) Filed: Sep. 28, 2006

(65) Prior Publication Data

US 2007/0071101 A1    Mar. 29, 2007

Related U.S. Application Data

(60) Provisional application No. 60/721,108, filed on Sep. 28, 2005.

(51) Int. Cl.
*H04B 1/66* (2006.01)
*H04N 7/12* (2006.01)

(52) U.S. Cl. ............... 375/240.16; 375/240.12

(58) Field of Classification Search .............. 348/699, 348/715–723, 415.1, 402.1, 407.1, 413.1; 382/232, 236, 240, 282; 375/240.012–240.26
See application file for complete search history.

(56) References Cited

U.S. PATENT DOCUMENTS

| | | | |
|---|---|---|---|
| 5,884,057 A | 3/1999 | Blomgren et al. | |
| 5,892,847 A | 4/1999 | Johnson | |
| 5,923,892 A | 7/1999 | Levy | |
| 6,757,019 B1 | 6/2004 | Hsieh et al. | |
| 6,865,663 B2 | 3/2005 | Barry | |
| 6,950,929 B2 | 9/2005 | Chung et al. | |
| 7,079,147 B2 | 7/2006 | Wichman et al. | |
| 7,079,579 B2 * | 7/2006 | Han et al. | 375/240.16 |
| 7,180,943 B1 | 2/2007 | Arlid et al. | |
| 2002/0025001 A1 | 2/2002 | Ismaeil et al. | |
| 2002/0039386 A1 * | 4/2002 | Han et al. | 375/240.16 |
| 2002/0114394 A1 * | 8/2002 | Ma | 375/240.16 |
| 2003/0198295 A1 * | 10/2003 | Chen et al. | 375/240.16 |

(Continued)

FOREIGN PATENT DOCUMENTS

EP    1 503 595    2/2005

(Continued)

OTHER PUBLICATIONS

Smith, et al, "The Astronautics ZS-1 Processor", Proceedings of the International Conference on Computer Design : VLSI in Computers and Processors (ICCD). New York, 10/3-5; pp. 307-310.

(Continued)

*Primary Examiner* — Behrooz Senfi
(74) *Attorney, Agent, or Firm* — Fenwick & West LLP

(57) ABSTRACT

Systolic array-based systems and methods for performing block matching in motion compensation. A target pixel block is loaded into a systolic array. A matching sized block of a reference search space is loaded into the array, row by row. A sum of absolute difference (SOAD) is computed for each row and stored. After each row has been loaded, the reference space is incremented to the next column. After the entire reference space has been searched, the reference block with the smallest SOAD is taken as the motion vector for the target pixel block.

15 Claims, 6 Drawing Sheets

U.S. PATENT DOCUMENTS

| | | | |
|---|---|---|---|
| 2004/0252766 A1* | 12/2004 | Lee et al. | 375/240.17 |
| 2006/0020929 A1* | 1/2006 | Liu | 717/136 |
| 2006/0047934 A1 | 3/2006 | Schmisseur et al. | |
| 2007/0070080 A1 | 3/2007 | Graham et al. | |
| 2007/0071106 A1 | 3/2007 | Graham et al. | |
| 2007/0073925 A1 | 3/2007 | Lim et al. | |
| 2007/0074004 A1 | 3/2007 | Wong et al. | |
| 2007/0074007 A1 | 3/2007 | Topham et al. | |
| 2007/0074012 A1 | 3/2007 | Graham et al. | |

FOREIGN PATENT DOCUMENTS

| | | |
|---|---|---|
| GB | 2365583 | 2/2002 |
| WO | WO-93-08526 | 4/1993 |
| WO | WO-2006/096612 | 9/2006 |

OTHER PUBLICATIONS

Osako, F., et al., "A Dynamic Computation Resource Scalable Algorithm for Software Video CODEC," NTG Fachberichte, VDE Verlag, 143:515-518 (1997).

Ray, A., et al., "Complexity-Distortion Analysis of H.264/JVT Decoders on Mobile Devices," Picture Coding Symposium PSC, http://www.egr.msu.edu/waves/people/Radha_files/2004/PSC04.pdf (2004).

Wiegand, T., et al., "Rate-Constrained Coder Control and Comparison of Video Coding Standards," IEEE Transactions on Circuits and Systems for Video Technology, 13(7):688-703 (2003).

* cited by examiner $X_t$ = pixel of target block presented at time t
$r_t$ = pixel of reference block presented at time t Each cell computes 8-bit absolute difference between target and reference pixels 8 cycles after starting block calculation, a row produces a block difference result

400

SYSTOLIC-ARRAY BASED SYSTEMS AND METHODS FOR PERFORMING BLOCK MATCHING IN MOTION COMPENSATION

CROSS REFERENCE TO RELATED APPLICATIONS

This application claims priority to U.S. Provisional Patent Application No. 60/721,108 titled "SIMD Architecture and Associated Systems and Methods," filed Sep. 28, 2005, the disclosure of which is hereby incorporated by reference in its entirety.

FIELD OF THE INVENTION

The invention relates generally video processing and more specifically to systems and methods for performing block matching in motion compensation applications.

BACKGROUND OF THE INVENTION

A video sequence consists of a number of still image frames presented in time sequence to create the appearance of continuous motion. High quality video is usually comprised of thirty or more frames per second. Thus, when digitizing a high resolution video clip, the required bandwidth increases rapidly. The amount of data required to represent even a single picture (still image) is derived by the frame's dimensions multiplied by the pixel depth. Thus, even 640×480 video with a pixel depth of 256, that is, 8 bits for each of the RGB or YUV elements of each pixel would require 0.9216 Megabytes per frame without compression. At thirty frames per second, that is a throughput of 27.648 Mbytes per second. However, because video is merely a sequence of frames, subsequent frames are often very similar in terms of their content, containing a lot of redundant data. When compressing video, this redundant data is removed to achieve data compression.

In video compression applications, motion compensation describes a current frame in terms of where each block of that frame came from in a previous frame. Motion compensation reduces the amount of data throughput required to reproduce video by describing frames by their measured change from previous and subsequent frames.

Various techniques exist for performing motion compensation. A first approach is to simply subtract a reference frame from a given frame. The difference is called residual and usually contains less information than the original frame. Thus, rather then encoding the frame, only the residual is encoded. The residual can be encoded at a lower bit-rate without degrading the image quality. The decoder can reconstruct the original frame by simply adding the reference frame again.

Another technique is to estimate the motion of the whole scene and the objects in a video sequence. The motion is described by some parameters that have to be encoded in the bit-stream. The blocks of the predicted frame are approximated by appropriately translated blocks of the reference frame. This gives more accurate residuals than a simple subtraction. However, the bit-rate occupied by the parameters of the motion model can become quite large. This runs contrary to the goal of achieving high compression ratios.

Video frames are often processed in groups. One frame (usually the first) is encoded without motion compensation just as a normal image, that is, without compression. This frame is called I-frame or I-picture. The other frames are called P-frames or P-pictures and are predicted from the I-frame or P-frame that comes (temporally) immediately before it. The prediction schemes are, for instance, described as IPPPP, meaning that a group consists of one I-frame followed by four P-frames.

Frames can also be predicted from future frames. The future frames then need to be encoded before the predicted frames and thus, the encoding order does not necessarily match the real frame order. Such predicted frames are usually predicted from two directions, i.e. from the I- or P-frames that immediately precede or follow the predicted frame. These bidirectionally predicted frames are called B-frames.

In block motion compensation, frames are partitioned in blocks of pixels (e.g. macroblocks of 16×16 pixels in MPEG). Each block is predicted from a block of equal size in the reference frame. The blocks are not transformed in any way apart from being shifted to the position of the predicted block. This shift is represented by a motion vector. The motion vectors are the parameters of this motion compensation model and have to be encoded into the bit-stream.

Existing block matching methods may be performed in software, or may be implemented by a special-purpose hardware device. Software implementations have the disadvantage of being slow, whereas hardware solutions often lack the flexibility needed to support a wide range of different video encoding standards. A specific problem associated with both software and hardware techniques is that of memory alignment. To achieve high performance motion estimation, the pixels of the reference frame should be retrieved from memory in groups of 8 or even 16. However, blocks of pixels from the reference frame are not guaranteed to be located in memory at an address that is an integer multiple of 8. This may require non-aligned accesses, with extra hardware and additional memory access cycles, and is therefore one problem with existing methods.

SUMMARY OF THE INVENTION

In view of the foregoing, at least one embodiment of the invention may provide a systolic array-based method for performing block matching for motion compensation in a video codec. The method according to this embodiment may comprise loading a target pixel block into an array of systolic cells, loading an equivalently sized reference block from a reference block search space, and for each block, computing a sum of absolute difference (SOAD) between pixels in each row of the target block and the reference block incrementing the reference block and repeating the difference computation until all reference blocks in the reference block search space have been tested, whereupon the reference block having the lowest SOAD is selected as a motion vector for the target block.

Another embodiment of the invention may provide a method of performing block matching with a systolic array. The method according to this embodiment comprises selecting an N×N target pixel block, selecting an N×N reference block from a starting point of an N×M reference block search space, propagating the target and reference blocks through N cycles to completely load the target and reference blocks into an array of systolic cells, computing a sum of absolute difference (SOAD) between a pixel of the target block and the reference block for each N rows of the array, saving the SOAD for the current reference block, incrementing to the next reference block of the N×M reference block search space and selecting a new N×N reference block, repeating the propagating, computing, saving and incrementing steps until all blocks in the reference search space have been tested, and selecting the block from the reference search space having the lowest SOAD as a motion vector for the target block.

A further embodiment according to the invention may provide a method for performing block matching on an N×M reference block of pixels. The method according to this embodiment may comprise selecting an N×N target block of pixels, selecting an N×N reference block of pixels from an N×M reference block search space, starting a 0,0 position of the N×M reference block search space, propagating rows of the target and reference blocks through cells of the systolic array on N successive clock cycles, computing a sum of absolute difference (SOAD) between rows of the reference block and target block on N successive clock cycles, storing the SOAD values for the N×N reference block, incrementing to the next column of the N×M reference block search space and selecting a new reference block, performing the propagating, computing, storing, and incrementing steps iteratively until a SOAD calculation has been performed for the last row of the N×N search block beginning at column M−N+1, and selecting the block with the lowest SOAD as the motion vector for the target block These and other embodiments and advantages of the present invention will become apparent from the following detailed description, taken in conjunction with the accompanying drawings, illustrating by way of example the principles of the invention

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION

The following description is intended to convey a thorough understanding of the embodiments described by providing a number of specific embodiments and details involving systems and methods for performing block matching for motion compensation applications. It should be appreciated, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

As discussed herein, a primary task in video encoding is block matching. Block matching achieves high video compression ratios by finding a region in a previously encoded frame that is a close match for each macro block in a current video frame. The spatial offset between the current block and reference block is called a motion vector. Block matching algorithms compute the pixel-by-pixel difference between a selected block of a reference frame and current block. Temporal redundancy between blocks in subsequent frames allows the encoder to encode the video without encoding the pixel values of each block.

Figure 1:
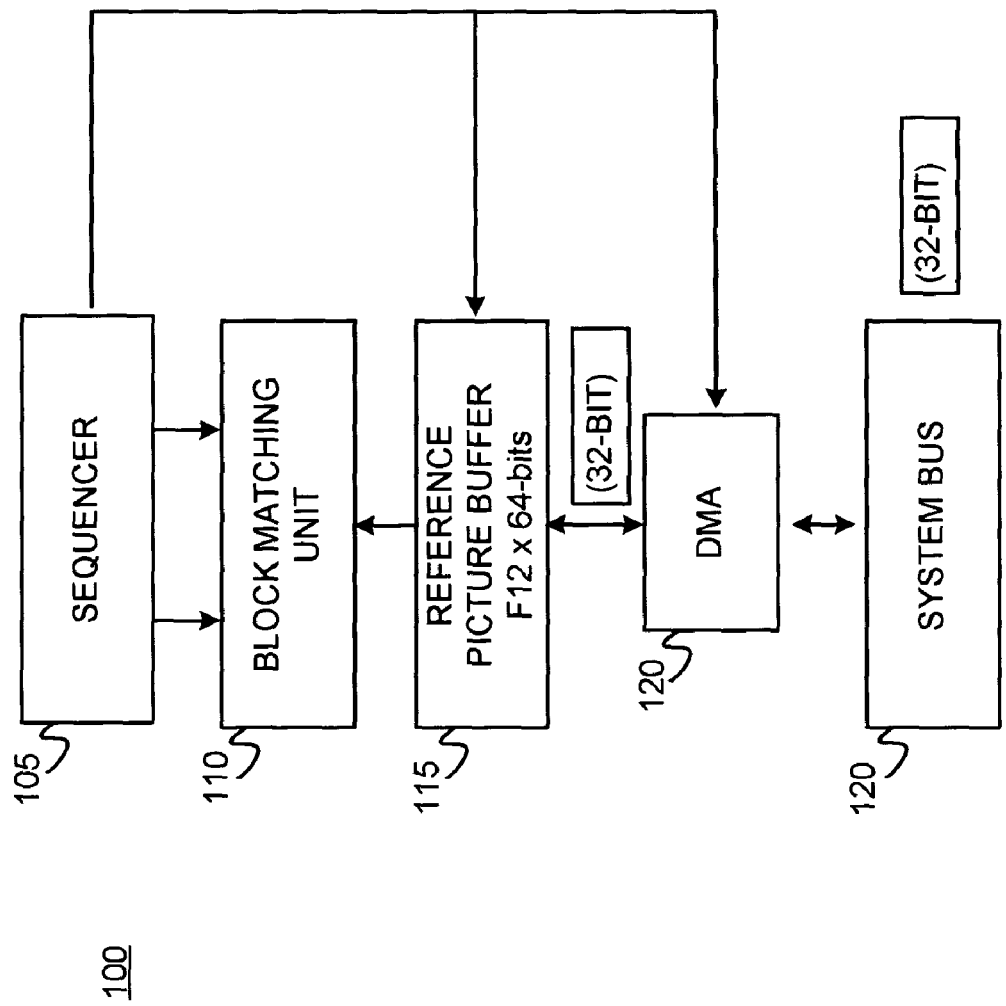
FIG. 1 is a block diagram illustrating an architecture for a systolic array-based block matching system and method according to at least one embodiment of the invention.

Accordingly, various embodiments of the invention provide a flexible and efficient systolic array-based block matching algorithm that can be configured to match blocks of size 4×4, 4×8, 8×4 and 8×8 pixels, etc., to provide support for variable block sizes in the H.264 and most other modern video codec standards. Referring now to FIG. 1, a block diagram illustrating an architecture for performing the sum of absolute difference (SOAD) calculation for block matching according to at least one embodiment of the invention is depicted. In the embodiment of FIG. 1, the architecture 100 consists of four primary components: the sequencer 105, the block matching unit 110, the reference picture buffer 115, and the DMA unit 120. In various embodiments, the sequencer 105 functions as the control unit executing the search sequence. The block matching unit 110 comprises a wide data path, which, in various embodiments, is able to load 8 reference pixels and cycle through an 8×8 block, such that each row of reference pixels is used 8 times. In various embodiments the reference picture buffer 115 is used to store a large number (several blocks) of reference pixels to reduce the required bandwidth between the block matching unit 110 and system memory. As discussed herein, in various embodiments, the DMA unit 100 may comprise a pair of DMA units such as, for example, data input and data output units.

Figure 2:
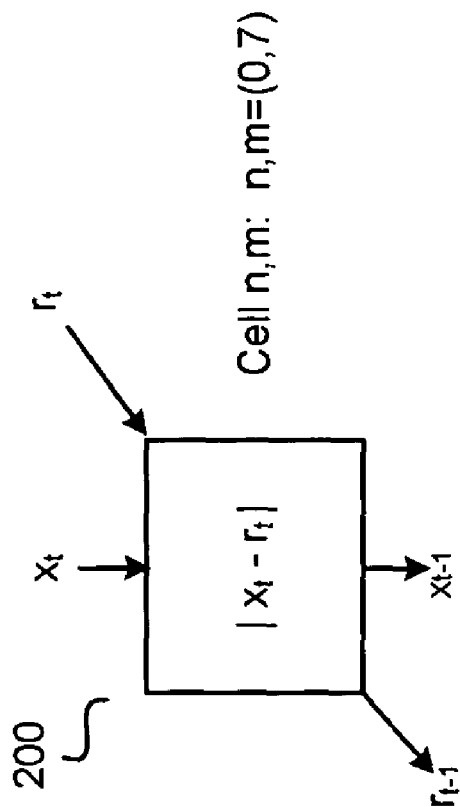
FIG. 2 is a diagram of a cell of systolic array according to at least one embodiment of the invention.

Referring now to FIG. 2, a block diagram depicting an exemplary cell in the systolic array-based block matching algorithm architecture according to at least one embodiment of the invention is provided. In various embodiments, each cell of the systolic array computes an 8-bit absolute difference between target and reference pixels. As the target and reference pixels move across the systolic array, the absolute difference of each such pair of pixels is computed and accumulated. In various embodiments, each row computes the sum of the 8 cell results. Thus, eight cycles after starting a block calculation, a row will produce a block sum of absolute difference (SOAD) result. $X_t$ represents the pixel of the target block at time t and $r_t$ represents the pixel of the reference block at time t. In various embodiments the start of each row calculation is staggered by 1 clock cycle so that results are emitted 1 per cycle. This allows efficient re-use of hardware because each of the N rows can share a single adder. Various embodiments will employ an 8×8 array of systolic cells like the cell 200 of FIG. 2, such that cell [i,j] is row j and column i, with number increasing from top to bottom and from left to right. $X_{t-1}$ shows that the pixel of the target block is propagated down the array each time cycle. Also, $r_{t-1}$ represents the pixel of the reference block presented at time t. This too propagates down the array so that the same row of the target block is being matched to the corresponding row of the reference block.

Figure 3:
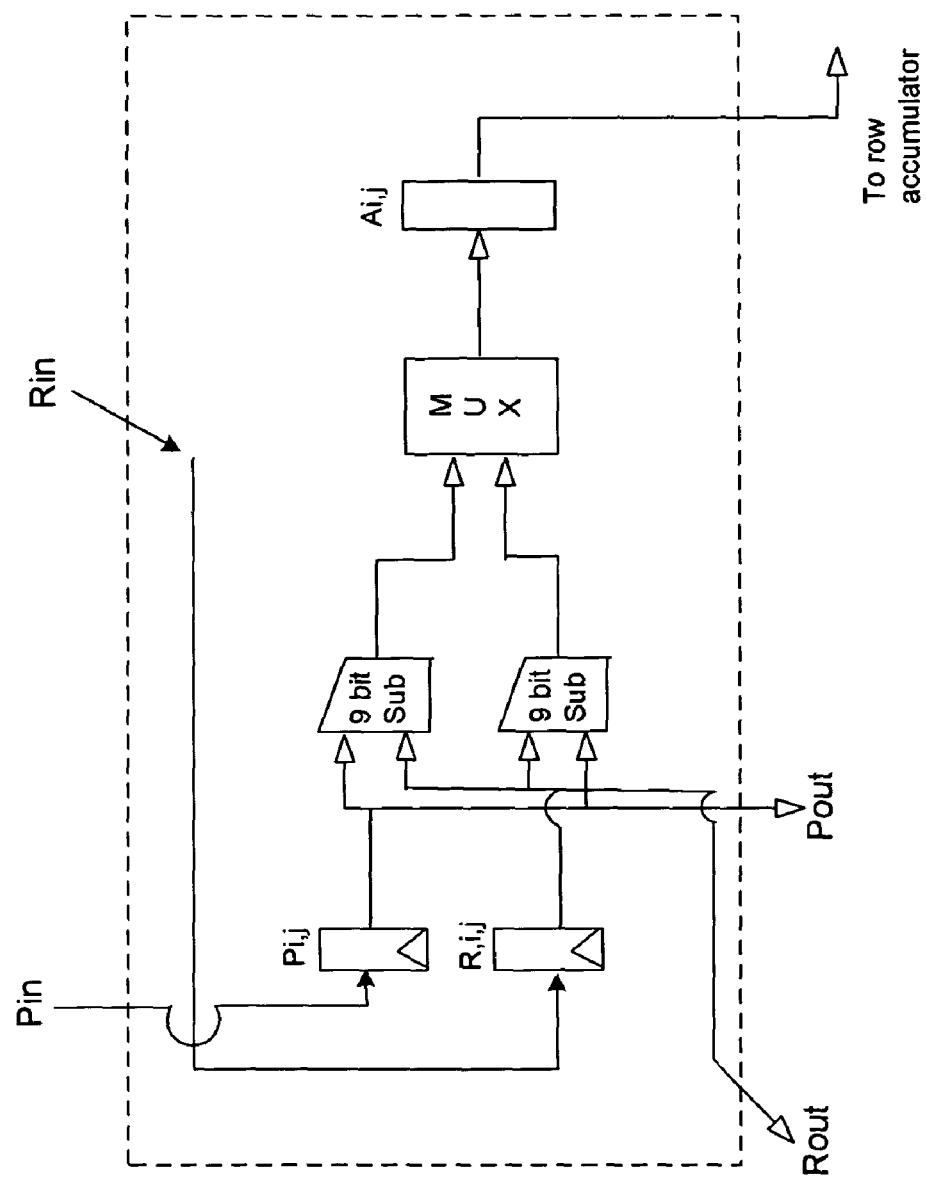
FIG. 3 is a block circuit diagram of the components of a systolic cell according to an embodiment of the invention.

As seen in FIG. 3, in various embodiments, each cell comprises three 8-bit registers, $P_{i,j}$, $R_{i,j}$ and $A_{i,j}$. Also, each row j of the array of systolic cells may contain two additional registers Carry[j] and Sum [j] which need to be at least 14 bits in size. The connectivity of the cells in the systolic array is such that the output of P[i,j] is connected to the input of P[i, k], where k=j+1, mod 8. Each P[i,j] has a multiplexer at its input to allow values to be loaded externally. The output of R[i,j] is connected to the inputs R[i−1,q] where q=j+1, mod 8. Thus, the difference of each pixel is output to the row accumulator. After a reference block has been searched, the target block values in the bottom of the array are copied to the top of the array so that the target block keeps cycling through the array with each newly loaded reference block.

Figure 4:
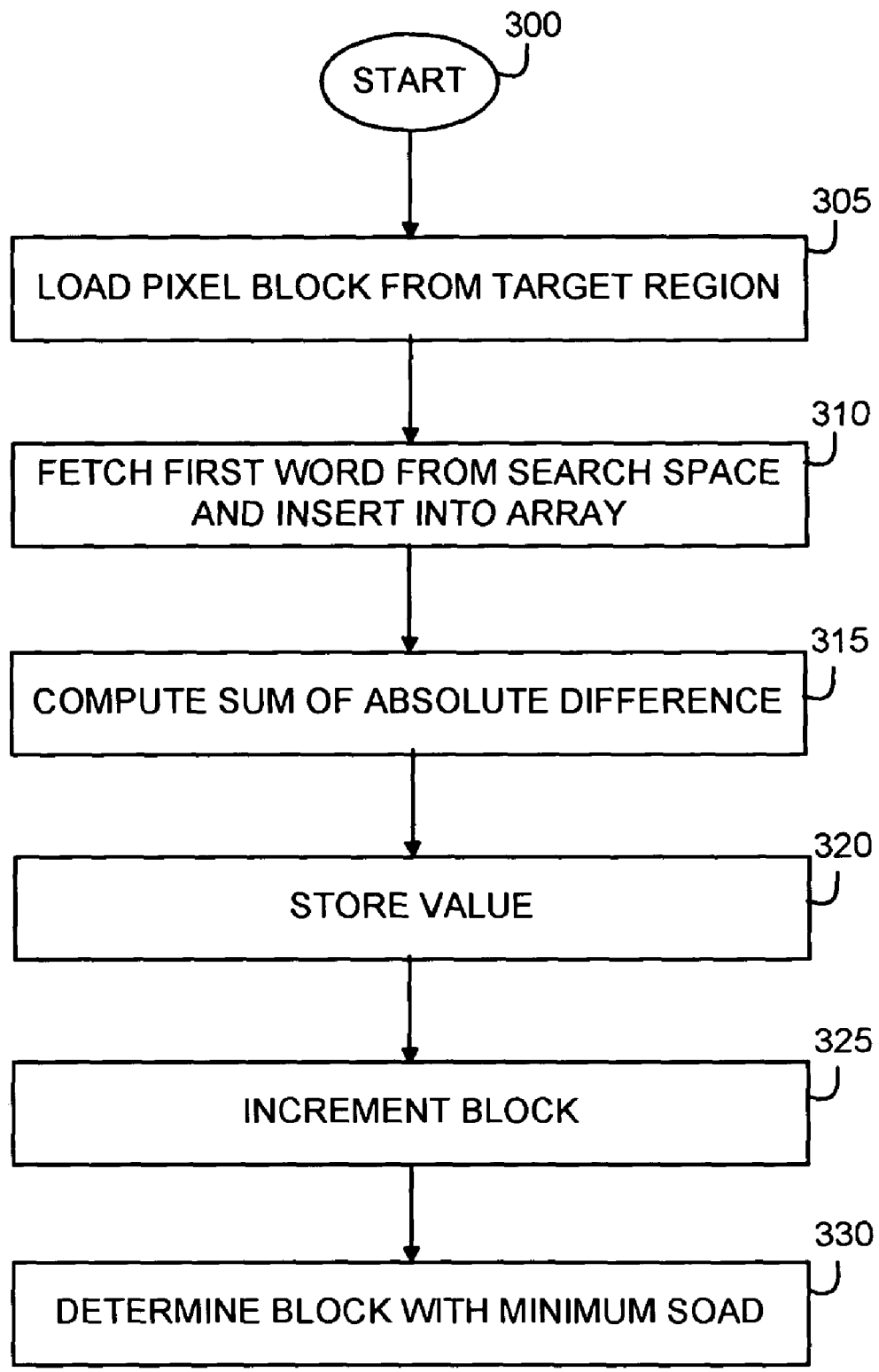
FIG. 4 is a flow chart of an exemplary method for performing block matching in accordance with at least one embodiment of the invention.
Figure 5:
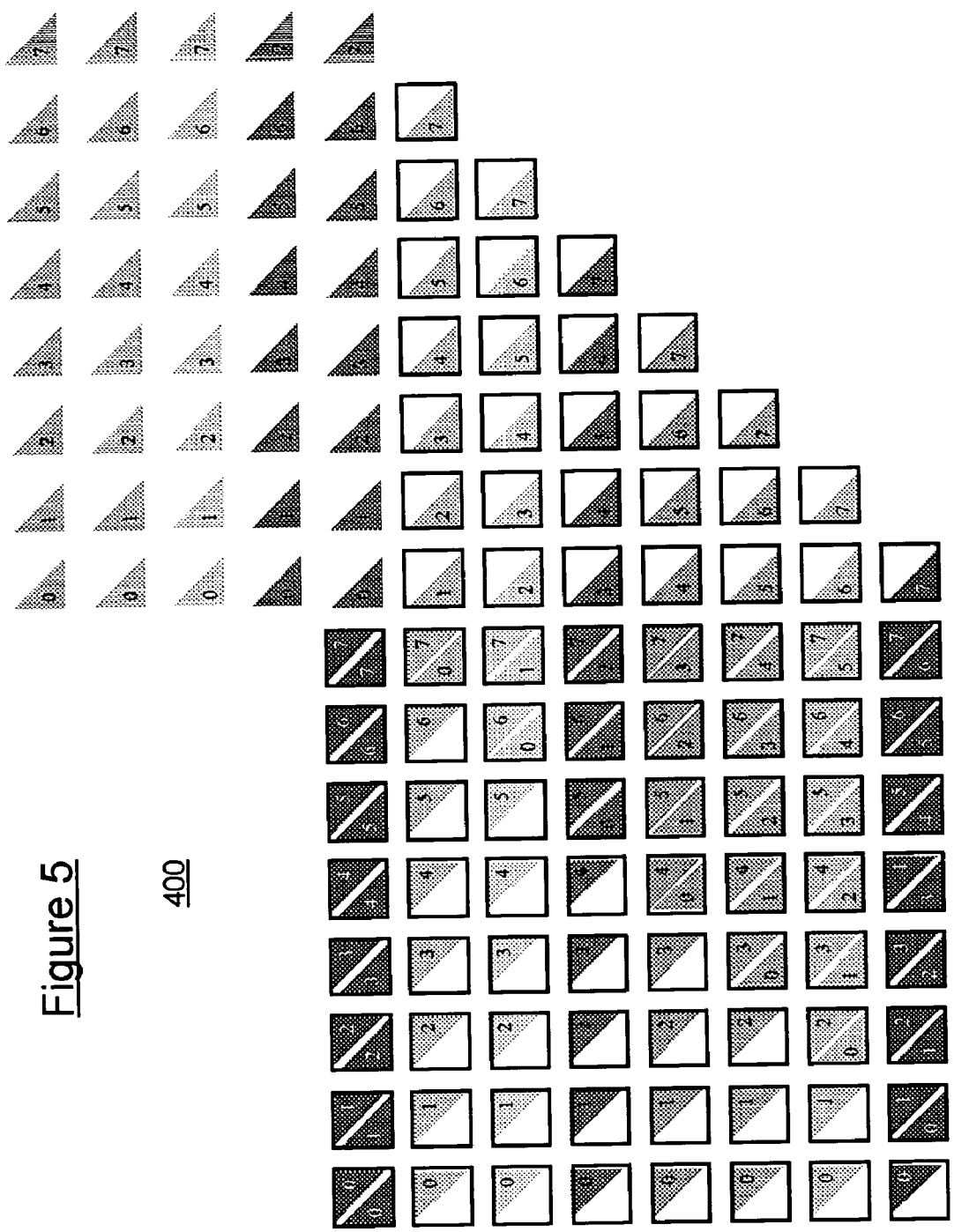
FIG. 5 is a diagram of a systolic array and 64-bit word taken from the search space to be compared using the block matching method according to at least one embodiment of the invention.

Description of the various embodiments of the systolic array will be described in method steps in the context of FIGS. 4 and 5. The method begins in step 300 and proceeds to step 305 where the pixel block from the target region is loaded. In various embodiments, this comprises loading an 8×8 pixel-block from the target region into the systolic array. The block matching algorithm is searching for a match with this target region. In various embodiments, the pixel values are loaded by presenting each row of 8 values from the target block on successive cycles to signals P[i,0] (for i from 0 to 7) at the top of an 8×8 array of cells. At each cycle the already-loaded P[i,j] values move vertically down the 8×8 matrix of cells, to location P[i,j+1], so that after 8 such cycles all 8 rows of the systolic array have been loaded with the target block. FIG. 5 illustrates the systolic array 400 and 64-bit word from the search space.

Next, in step 310, to begin searching, the first 64-bit word from the top-left hand corner of the search space is fetched from memory and inserted into the triangular input array at the right-hand side of the systolic array, that is, the first 64-bit word of the reference blocks. In step 315, the sum of absolute difference (SOAD) is computed for each row. It should be appreciated that in various embodiments, the systolic array needs to be primed for 8 cycles before it begins the first SOAD calculation. This is to allow for the first input word to propagate through the triangular array of input cells and arrive at the row 0 of the systolic array. Alternatively, the first 8 results can be discarded. This will yield the same results as waiting 8 cycles before beginning to perform SOAD calculations. This SOAD value is stored in step 320 and the block is incremented through another eight clock cycles in step 325. In various embodiments, the loading of 64-bit words from the search space continues at the rate of one word per cycle for the remainder of the search. Then, in step 330, after a SOAD value has been calculated for each row in the search space, the block with the minimum SOAD value is determined. In various embodiments, this block is considered a match.

The N×M blocks of the search space are scanned sequentially, proceeding horizontally across the search space, such that a new column of pixels is added and an old one dropped from the target block on each sequence until each vector has been tested. Each block is loaded into the systolic array, starting at row 0 of the block and continuing to row 7, before moving on to consider the next block (that is, incrementing the block by one column) in the search space. This defines an address pattern that must be followed when fetching words from the search space. When the last word of the last block in the N×M search space has been loaded, the search terminates.

Figure 6:
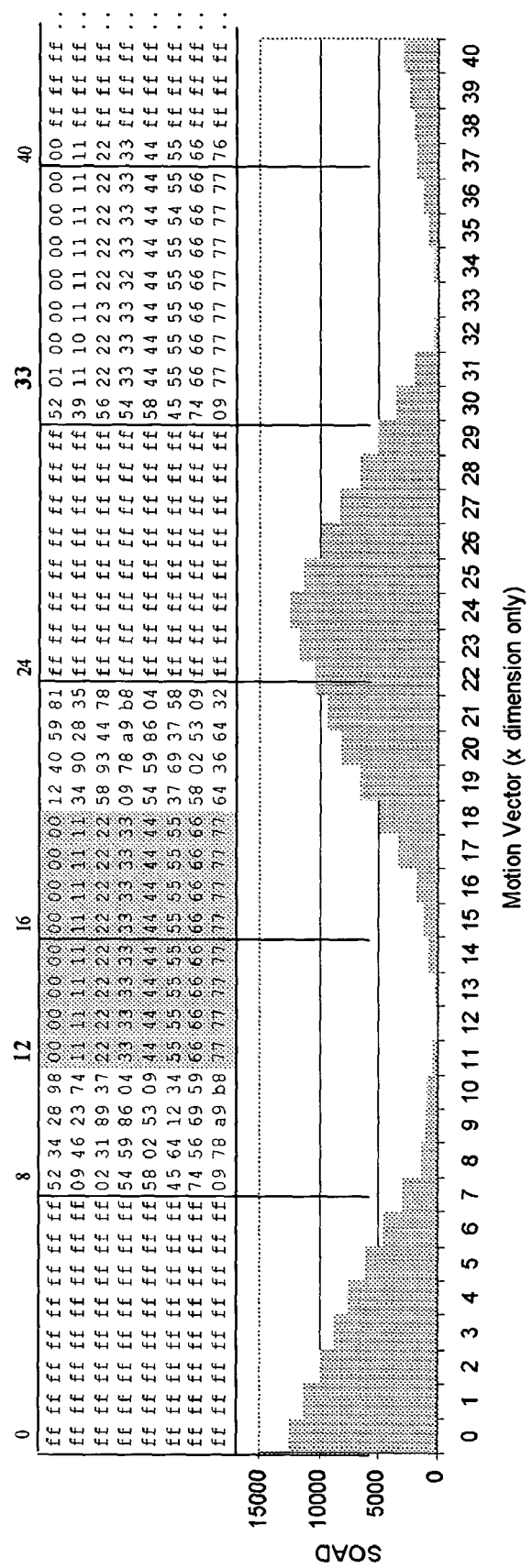
FIG. 6 is an exemplary 8×8 target pixel block and exemplary N×8 search space comprised of (N−7) 64-bit search words that the target pixel block is matched against according to at least one embodiment of the invention.

FIG. 6 illustrates an exemplary target array of 8×8 pixels 500 to be loaded in the systolic array and an exemplary search space in which the matching block in the search space is located at motion vector 12, in the X direction from the top left of the search space. In various embodiments, the systolic array operates such that on each clock pulse, all A[i,j] values are added together using a carry-save adder tree, sometimes referred to in the industry as a Wallace Tree. This produces two 14-bit values which, are assigned to the Carry[j] and Sum[j] registers on each successive clock pulse.

As discussed herein, when the array is matching blocks of 8×8 pixels, each row produces one SOAD value every eight clock pulses. Each result represents the sum of the absolute differences between the target block and a reference block from the search space. Row k produces a SOAD value one cycle after row j, where k=j−1, mod 8. Thus, results appear one per cycle in a cyclic manner starting with row 0, and continuing to rows 1, 2, . . . , and 7. In various embodiments, these results can be stored. In various other embodiments these results are fed into a block of logic to compute the minimum of all computed SOAD values and to associate this minimum value with the position of the corresponding block in the N×M search space. The position of the block in the search space that generates the minimum SOAD values defines a potential motion vector for performing motion-compensation in a block-based video encoder such as the H.264 codec.

Another feature of the various embodiments of the invention is the ability to perform sub-block searches. In various embodiments, the carry-save adder associated with each row of 8 cells can be partitioned into two smaller carry-save adders and two separate pairs of carry/sum registers. Carry[u][j] and Sum[u][j], for u $\{0,1\}$. In various embodiments this partitioning can be controlled by a mode bit so that the full-row computation or the dual half-row computation can be set at run time. In the half-row mode of operation, each row computes for 4 cycles rather than the 8 cycles described in the context of the 8×8 blocks. At the end of each 4-iteration cycle, each row produces two SOAD values representing the closeness of the match between two adjacent 4×4 blocks from the target block and two adjacent 4×4 blocks from the search space. Four such SOAD values, representing the closeness of match for the four 4×4 quadrants of an 8×8 block, can be added together to generate the SOAD value for an 8×8 block. If for example, quadrants A, B, C, and D are equal-sized sub-blocks of an 8×8 block, the generated 4×4 SOAD values can be added pair-wise to generate all possible sub-block SOAD values for 8×4 or 4×8 blocks.

As with 8×8 SOAD values, it is possible to forward 4×4 SOAD values at the rate of two per cycle to a subsequent block of logic to compute the lowest SOAD value for A, B, C, D, (A+B), (C+D), (A+C), (B+D), and (A+B+C+D). For each of these minima, the subsequent logic must store a motion vector (x,y) where x and y are the horizontal and vertical coordinate of the sub-block generating each minimum SOAD value.

Various embodiments of the invention may also provide for storing more than one minimum SOAD value for the target block, or each sub-block if performing a sub-block search. This allows the logic to compute not only the "best matching block" but also the "next best matching block." If these two blocks differ by at most 1 in both x and y directions, then it may be possible to find a better match by searching at sub-pixel resolution. This can be performed through conventional techniques by using an up-sampling technique (such as, for example, bilinear or bicubic interpolation) over a smaller search space defined by a perimeter that is the smallest rectangle enclosing the two best matching blocks. In various embodiments, when an upsampled search space has been computed, the same systolic array can be used to search this space using the same method. In this case, the target block does not need to be loaded because it will already be in place within the array.

Thus, the systolic array-based systems and methods according to the various embodiments discussed herein, provides various improvements over existing systems and methods. Through the novel architecture disclosed herein, the block matching array is provided with the ability to load the array with 64-bit values that are always read from 64-bit aligned memory locations. This is an advantage over previous schemes, which load the systolic array with 8-bits per cycle. Also, previous systems and methods have been limited in the range of N and M, i.e. in the definition of the search space. The systems and methods according to the various embodiments of the invention can search an unbounded space. Also, the use of carry-save adders reduces the gate count of the resulting logic because there are fewer temporary SOAD values, thereby simplifying design and reducing costs. Any systolic array that passes partial SOAD values from cell to cell must contain a partial SOAD register in each cell. These are 14 bits in size, which is nearly twice the size of the 8-bit local absolute difference value (A[i,j]) needed in this scheme. In the systolic-array based block matching according to the various embodiment of the invention, only two 14-bit registers are needed per row.

Another advantage of the systolic array-based block matching scheme according the various embodiments of the invention is that the carry save register values need to be added before the final SOAD value is made available. As the final Carry/Sum values resulting from each row are produced at different times, the same full-adder circuit can be shared by all rows. Alternatively, if computing 4×4 sub-block SOAD values, only two full-adders will be required. The ability to select between computing 1 8×8 or 4 4×4 SOAD values per cycle is another improvement compared to previous schemes. This is particularly useful for encoding video streams using the H.264 standard, which supports motion compensation on variable block sizes, i.e., 4×4, 8×4, 4×8 and 8×8.

It should be appreciated that the systolic array-based block matching system and method discussed above can be extended to match blocks of dimension P×Q, where P is {4, 8, 16} and Q is any multiple of 4. For example, to perform block matching on blocks of dimension 16×16 pixels, the systolic array would be 16×16 instead of 8×8 as discussed above. Alternatively, four 8×8 SOAD values can be combined to produce a 16×16 block SOAD using the configuration discussed above in the context of FIGS. 5 and 6. Such modifications are within the spirit and scope of the invention. Thus, the systolic array-based block matching system and method according to the various embodiments of the invention is highly flexible.

The embodiments of the present inventions are not to be limited in scope by the specific embodiments described herein. For example, although many of the embodiments disclosed herein have been described with reference to systems and method for block matching in motion estimation using systolic array-based techniques, the principles herein are equally applicable to other aspects of microprocessor design and function. Indeed, various modifications of the embodiments of the present inventions, in addition to those described herein, will be apparent to those of ordinary skill in the art from the foregoing description and accompanying drawings. Thus, such modifications are intended to fall within the scope of the following appended claims. Further, although some of the embodiments of the present invention have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breath and spirit of the embodiments of the present inventions as disclosed herein

The invention claimed is:

1. A method of performing block matching comprising:
loading, by a processor, an N×N target block into an array of systolic cells;
for each of a plurality of N×N reference blocks in an N×M reference search space comprising an (M−N+1) number of N×N reference blocks:
loading, by the processor, the N×N reference block into the array;
computing, by the processor, a sum of absolute difference (SOAD) between target block pixels and reference block pixels; and
saving the SOAD for the reference block;
determining, by the processor, whether to select the N×N reference block having a lowest computed SOAD from the (M−N+1) reference blocks in the reference search space as a motion vector for the N×N target block.

2. The method according to claim 1, wherein loading each reference block into the array of systolic cells comprises loading the block starting at row 0 of the block and continuing to row N−1.

3. The method according to claim 2, wherein each first column of the (M−N+1) reference blocks comprises a different column of the first (M−N+1) columns of the N×N reference search space.

4. The method according to claim 3, wherein each reference block is loaded based on the order the first column of the reference block appears in the reference search space, and where all blocks in the search space have been tested when a SOAD has been computed for the N×N reference block having a first column comprising the (M−N+1) column of the N×N reference search space.

5. The method according to claim 1, wherein N=8.

6. The method according to claim 1, wherein computing the SOAD between the target block pixels and the reference block pixels comprises performing a SOAD calculation for each row of the N×N reference block.

7. The method according to claim 1, wherein determining whether to select the N×N reference block having a lowest computed SOAD comprises selecting two blocks having a lowest SOAD and a second lowest SOAD and searching over a second reference search space defined by a perimeter that is the smallest rectangle enclosing the two selected blocks at sub-pixel resolutions.

8. A method for performing block matching comprising:
selecting, by a processor, an N×N target block;
selecting, by the processor, an N×N reference block from an N×M reference search space, starting at a first column of the N×M reference search space, the N×M reference search space comprising an (M−N+1) number of N×N reference blocks;
loading, by the processor, N rows of the N×N target block and the N×N reference block through cells of a systolic array on N successive clock cycles;
computing, by the processor, a sum of absolute difference (SOAD) between each row of the reference block and target block on N successive clock cycles;
storing, by the processor, the SOAD values for the N×N reference block;
incrementing to the next column of the N×M reference search space and selecting a new reference block;
performing the loading, computing, storing, and incrementing steps iteratively until a SOAD value has been computed for the last row of the N×N search block beginning at column M−N+1 of the reference search space;

determining, by the processor, whether to select the reference block with the lowest SOAD value from the (M−N+1) reference blocks in the reference search space as the motion vector for the target block.

9. A system for performing block matching comprising:
a block matching unit configured to load an N×N target block into an array of systolic cells; and
a sequencer configured to, for each of a plurality of N×N reference blocks in an N×M reference search space comprising an (M−N+1) number of N×N reference blocks:
load the N×N reference block into the array;
compute a sum of absolute difference (SOAD) between target block pixels and reference block pixels;
save the SOAD for the reference block;
select the N×N reference block having a lowest SOAD from the (M−N+1) reference blocks in the reference search space as a motion vector for the N×N target block.

10. The system according to claim 9, wherein loading each reference block into the array of systolic cells comprises loading the block starting at row 0 of the block and sequentially loading subsequent rows up to row N−1.

11. The system according to claim 10, wherein each first column of the (M−N+1) reference blocks comprises a different column of the first (M−N+1) columns of the N×N reference search space.

12. The system according to claim 11, wherein each reference block is loaded based on the order the first column of the reference block appears in the reference search space, and where all blocks in the search space have been tested when a SOAD has been computed for the N×N reference block having a first column comprising the (M−N+1) column of the N×N reference search space.

13. The system according to claim 9, wherein N=8.

14. The system according to claim 9, wherein computing the SOAD between the target block pixels and the reference block pixels comprises performing a SOAD calculation for each row of the N×N reference block.

15. The system according to claim 9, wherein selecting the N×N reference block comprises selecting two blocks having a lowest SOAD and a second lowest SOAD and searching over a second reference search space defined by a perimeter that is the smallest rectangle enclosing the two selected blocks at sub-pixel resolutions.

* * * * *